United States Patent
Odell et al.

(10) Patent No.: US 10,652,179 B2
(45) Date of Patent: May 12, 2020

(54) MANAGING INSTANT MESSAGING SESSIONS ON MULTIPLE DEVICES

(71) Applicant: Google LLC, Mountain View, CA (US)

(72) Inventors: James A. Odell, Mountain View, CA (US); Barry Appelman, Fremont, CA (US); W. Karl Renner, Pacific Palisades, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/386,833

(22) Filed: Apr. 17, 2019

(65) Prior Publication Data

US 2019/0245817 A1 Aug. 8, 2019

Related U.S. Application Data

(63) Continuation of application No. 15/842,830, filed on Dec. 14, 2017, now Pat. No. 10,298,524, which is a
(Continued)

(51) Int. Cl.
*G06F 15/173* (2006.01)
*H04L 12/58* (2006.01)
(Continued)

(52) U.S. Cl.
CPC ......... *H04L 51/046* (2013.01); *G06Q 10/107* (2013.01); *H04L 51/04* (2013.01);
(Continued)

(58) Field of Classification Search
CPC ... H04L 65/1069; H04L 51/04; H04L 51/046; H04L 67/148; G06Q 10/107
See application file for complete search history.

(56) References Cited

U.S. PATENT DOCUMENTS

| 5,742,905 A | 4/1998 | Pepe et al. |
| 5,793,365 A | 8/1998 | Tang et al. |

(Continued)

FOREIGN PATENT DOCUMENTS

| WO | WO 2004079310 | 9/2004 |
| WO | WO 2006074040 | 7/2006 |
| WO | WO 2007047246 | 4/2007 |

OTHER PUBLICATIONS

"Audium X: Version History," [online], [retrieved on Dec. 14, 2004]. Retrieved from the Internet http://www.adiumx.com/history.html, (12 pages).
(Continued)

*Primary Examiner* — Thanh T Nguyen
(74) *Attorney, Agent, or Firm* — Fish & Richardson P.C.

(57) ABSTRACT

Transferring instant messaging sessions includes receiving a selection, from a user within a user interlace, of at least one instant messaging session from among multiple instant messaging sessions to transfer from a first instant messaging controller on a first device to at 5 least a second instant messaging controller on a second device, where the user is signed on concurrently to the first instant messaging controller on the first device and the second instant messaging controller on the second device. At least a portion of the selected instant messaging session is transferred from the first instant messaging controller on the first device to the second instant messaging controller on the second device and the transferred portion of 10 the instant messaging session is made perceivable on the second instant messaging controller on the second device.

20 Claims, 13 Drawing Sheets

Related U.S. Application Data continuation of application No. 15/412,819, filed on Jan. 23, 2017, now Pat. No. 9,900,274, which is a continuation of application No. 14/954,898, filed on Nov. 30, 2015, now Pat. No. 9,553,830, which is a continuation of application No. 13/757,015, filed on Feb. 1, 2013, now Pat. No. 9,210,109, which is a continuation of application No. 13/010,046, filed on Jan. 20, 2011, now Pat. No. 8,370,429, which is a continuation of application No. 12/022,437, filed on Jan. 30, 2008, now Pat. No. 7,877,450, which is a continuation of application No. 11/025,849, filed on Dec. 30, 2004, now Pat. No. 7,356,567.

(51) Int. Cl.
*G06Q 10/10* (2012.01)
*H04L 29/06* (2006.01)
*H04L 29/08* (2006.01)

(52) U.S. Cl.
CPC ...... *H04L 65/1069* (2013.01); *H04L 65/1096* (2013.01); *H04L 67/148* (2013.01)

(56) References Cited

U.S. PATENT DOCUMENTS

| | | | |
|---|---|---|---|
| 5,802,467 A | 9/1998 | Salazar et al. | |
| 5,828,312 A | 10/1998 | Yamazaki | |
| 5,872,521 A | 2/1999 | Lopatukin et al. | |
| 5,958,053 A | 9/1999 | Denker | |
| 5,960,173 A | 9/1999 | Tang et al. | |
| 6,212,548 B1 | 4/2001 | DeSimone et al. | |
| 6,260,148 B1 | 7/2001 | Aggarwal et al. | |
| 6,301,609 B1 | 10/2001 | Aravamudan et al. | |
| 6,324,492 B1 | 11/2001 | Rowe et al. | |
| 6,346,952 B1 | 2/2002 | Shtivelman | |
| 6,366,962 B1 | 4/2002 | Teibel | |
| 6,389,127 B1 | 5/2002 | Vardi et al. | |
| 6,405,035 B1 | 6/2002 | Singh | |
| 6,449,344 B1 | 9/2002 | Goldfinger et al. | |
| 6,453,294 B1 | 9/2002 | Dutta et al. | |
| 6,505,167 B1 | 1/2003 | Horvitz et al. | |
| 6,519,639 B1 | 2/2003 | Glasser et al. | |
| 6,539,421 B1 | 3/2003 | Appelman et al. | |
| 6,549,937 B1 | 4/2003 | Auerbach et al. | |
| 6,564,261 B1 | 5/2003 | Gudjonsson et al. | |
| 6,604,133 B2 | 8/2003 | Aggarwal et al. | |
| 6,631,412 B1 | 10/2003 | Glasser et al. | |
| 6,654,790 B2 | 11/2003 | Ogle et al. | |
| 6,658,095 B1 | 12/2003 | Yoakum et al. | |
| 6,668,167 B2 | 12/2003 | McDowell et al. | |
| 6,677,968 B1 | 1/2004 | Appelman | |
| 6,691,162 B1 | 2/2004 | Wick | |
| 6,701,345 B1 | 3/2004 | Carley et al. | |
| 6,714,519 B2 | 3/2004 | Luzzatti et al. | |
| 6,714,793 B1 | 3/2004 | Carey et al. | |
| 6,728,357 B2 | 4/2004 | O'Neal et al. | |
| 6,750,881 B1 | 6/2004 | Appelman | |
| 6,760,580 B2 | 7/2004 | Robinson et al. | |
| 6,791,583 B2 | 9/2004 | Tang et al. | |
| 6,807,562 B1 | 10/2004 | Pennock et al. | |
| 6,829,582 B1 | 12/2004 | Barsness | |
| 6,865,268 B1 | 3/2005 | Matthews et al. | |
| 6,876,728 B2 | 4/2005 | Kredo et al. | |
| 6,914,519 B2 | 7/2005 | Beyda | |
| 7,016,978 B2 | 3/2006 | Malik et al. | |
| 7,127,685 B2 | 10/2006 | Cabfield et al. | |
| 7,281,215 B1 | 10/2007 | Canfield et al. | |
| 7,328,242 B1 | 2/2008 | McCarthy et al. | |
| 7,356,567 B2 * | 4/2008 | Odell ................... | G06Q 10/107 709/206 |
| 7,383,308 B1 * | 6/2008 | Groves ................ | G06Q 10/109 709/206 |
| 7,716,483 B2 | 5/2010 | Sozzani et al. | |
| 7,769,811 B2 | 8/2010 | Heikes et al. | |
| 7,921,163 B1 | 4/2011 | Odell et al. | |
| 7,930,250 B2 | 4/2011 | Lee et al. | |
| 8,312,088 B2 | 11/2012 | Pinto | |
| 8,406,257 B2 | 3/2013 | Balassanian et al. | |
| 8,654,975 B2 | 2/2014 | Camenisch et al. | |
| 8,661,240 B2 | 2/2014 | Camenisch et al. | |
| 8,676,156 B1 | 3/2014 | Oroskar et al. | |
| 9,183,560 B2 * | 11/2015 | Abelow ............... | G06Q 10/067 |
| 9,307,493 B2 * | 4/2016 | Backholm ......... | H04W 52/0232 |
| 2001/0013050 A1 | 8/2001 | Shah | |
| 2001/0013069 A1 | 8/2001 | Shah | |
| 2001/0027474 A1 | 10/2001 | Nachman et al. | |
| 2001/0034224 A1 | 10/2001 | McDowell et al. | |
| 2001/0034622 A1 | 10/2001 | Davis | |
| 2002/0007398 A1 | 1/2002 | Mendiola et al. | |
| 2002/0023131 A1 | 2/2002 | Wu et al. | |
| 2002/0026483 A1 | 2/2002 | Isaacs et al. | |
| 2002/0026520 A1 | 2/2002 | Mendiola et al. | |
| 2002/0034281 A1 | 3/2002 | Isaacs et al. | |
| 2002/0035605 A1 | 3/2002 | McDowell et al. | |
| 2002/0046299 A1 | 4/2002 | Lefeber et al. | |
| 2002/0062345 A1 | 5/2002 | Guedalia et al. | |
| 2002/0065894 A1 | 5/2002 | Dalal et al. | |
| 2002/0087704 A1 | 7/2002 | Chesnais et al. | |
| 2002/0116461 A1 | 8/2002 | Diacakis et al. | |
| 2002/0116541 A1 | 8/2002 | Parker et al. | |
| 2002/0120687 A1 | 8/2002 | Diacakis et al. | |
| 2002/0120697 A1 | 8/2002 | Generous et al. | |
| 2002/0129103 A1 | 9/2002 | Birkler et al. | |
| 2002/0130904 A1 | 9/2002 | Becker et al. | |
| 2002/0139094 A1 | 10/2002 | Jonsson | |
| 2002/0178161 A1 | 11/2002 | Brezin et al. | |
| 2003/0037103 A1 | 2/2003 | Salmi et al. | |
| 2003/0055977 A1 | 3/2003 | Miller | |
| 2003/0088621 A1 | 5/2003 | Martinez et al. | |
| 2003/0101343 A1 | 5/2003 | Eaton et al. | |
| 2003/0158864 A1 | 8/2003 | Samn | |
| 2003/0162561 A1 | 8/2003 | Johnson et al. | |
| 2003/0167172 A1 | 9/2003 | Johnson et al. | |
| 2003/0179230 A1 | 9/2003 | Seidman | |
| 2003/0208545 A1 | 11/2003 | Eaton et al. | |
| 2003/0217109 A1 | 11/2003 | Ordille et al. | |
| 2003/0229722 A1 | 12/2003 | Beyda | |
| 2004/0019695 A1 | 1/2004 | Fellenstein et al. | |
| 2004/0030750 A1 | 2/2004 | Moore et al. | |
| 2004/0054737 A1 | 3/2004 | Daniell | |
| 2004/0056893 A1 | 3/2004 | Canfield et al. | |
| 2004/0059781 A1 | 3/2004 | Yoakum et al. | |
| 2004/0068567 A1 | 4/2004 | Moran et al. | |
| 2004/0073643 A1 | 4/2004 | Hayes et al. | |
| 2004/0078445 A1 | 4/2004 | Malik | |
| 2004/0111479 A1 | 6/2004 | Borden et al. | |
| 2004/0128353 A1 | 7/2004 | Goodman et al. | |
| 2004/0148346 A1 | 7/2004 | Weaver et al. | |
| 2004/0148353 A1 | 7/2004 | Karaoguz et al. | |
| 2004/0158608 A1 | 8/2004 | Friedman | |
| 2004/0158609 A1 | 8/2004 | Daniell et al. | |
| 2004/0179039 A1 | 9/2004 | Bilattner et al. | |
| 2004/0203695 A1 | 10/2004 | Mikan | |
| 2004/0205775 A1 | 10/2004 | Heikes et al. | |
| 2004/0223455 A1 | 11/2004 | Fong et al. | |
| 2004/0224772 A1 | 11/2004 | Canessa et al. | |
| 2004/0260753 A1 | 12/2004 | Regan | |
| 2005/0066365 A1 | 3/2005 | Rambo | |
| 2005/0069099 A1 | 3/2005 | Kozdon et al. | |
| 2005/0071433 A1 | 3/2005 | Shah | |
| 2005/0102365 A1 | 5/2005 | Moore et al. | |
| 2005/0120390 A1 | 6/2005 | Nonoyama | |
| 2005/0149620 A1 | 7/2005 | Kirkland et al. | |
| 2005/0210394 A1 | 9/2005 | Crandall et al. | |
| 2006/0031292 A1 | 2/2006 | Deshpande | |
| 2006/0034430 A1 | 2/2006 | Liakis | |
| 2006/0059024 A1 | 3/2006 | Bailey et al. | |
| 2006/0059240 A1 | 3/2006 | Qin et al. | |
| 2006/0173794 A1 | 8/2006 | Sellars et al. | |
| 2006/0212526 A1 | 9/2006 | Subramanian et al. | |
| 2007/0064709 A1 | 3/2007 | Holmstrom et al. | |
| 2007/0064710 A1 | 3/2007 | Holmstrom et al. | |

(56) References Cited

U.S. PATENT DOCUMENTS

| | | |
|---|---|---|
| 2007/0201430 A1 | 8/2007 | Holmstrom et al. |
| 2007/0223450 A1 | 9/2007 | Holmstrom et al. |
| 2008/0002698 A1 | 1/2008 | Pantalone et al. |
| 2008/0010209 A1 | 1/2008 | Lee et al. |
| 2008/0084973 A1 | 4/2008 | Verlare et al. |
| 2009/0217037 A1 | 8/2009 | Courtay et al. |
| 2011/0202660 A1 | 8/2011 | Pandya et al. |
| 2011/0319054 A1 | 12/2011 | Cutler et al. |
| 2012/0093062 A1 | 4/2012 | Perras et al. |
| 2012/0236847 A1 | 9/2012 | Beser |
| 2012/0278609 A1 | 11/2012 | Camenisch et al. |
| 2012/0294442 A1 | 11/2012 | Camenisch et al. |
| 2013/0005273 A1 | 1/2013 | Kips et al. |
| 2013/0314492 A1 | 11/2013 | Bicker |
| 2014/0126907 A1 | 5/2014 | Hirth et al. |
| 2014/0187221 A1 | 7/2014 | Ramachandran |

OTHER PUBLICATIONS

"Gaim: The Pimpin' Penguin IM Client that's good for the soul!" [online], [retrieved on Dec. 14, 2004]. Retrieved from the Internet http://gaim.sourceforge.net/ChangeLog, (27 pages).
"Max OS X in the Open: View topic—Adium History," [online], [retrieved on Dec. 14, 2004]. Retrieved from the Internet http://forums.cocaforge.com/viewtopic.php?t=168&highlight=history, (2 pages).
CIPO, Examination Report for Canadian Patent Application No. 2592803, dated Apr. 4, 2014, 6 pages.
CIPO, Examination Report for Canadian Patent Application No. 2592803, dated Feb. 11, 2013, 3 pages.
CIPO, Notice of Allowance for Canadian Patent Application No. 2,592,803, dated Jul. 14, 2016, 1 page.
EPO, Summons to Attend Oral Proceedings Pursuant to Rule 115(1) EPC for European Patent Application No. 05855851.1, Jun. 29, 2015, 8 pages.
European Examination Report, European Application No. 12175280.2, dated Aug. 30, 2013, 7 pages.
European Patent Office, Summons to Attend Oral Proceedings Pursuant to Rule 115(1) EPC for European Patent Application No. 12175280.2, May 19, 2017, 7 pages.
Examination Report dated Apr. 30, 2015 for Canadian Application No. 2592803.
Examination Report dated Apr. 4, 2015 for Canadian Application No. 2592803.
First Examination report dated Nov. 25, 2014, for India App No. 5429/DELNP/2007.
Indian Patent Office, Hearing Notice for Indian Patent Application No. 5429/DELNP/2007, dated Mar. 3, 2017, 7 pages.
International Search Report, Application Serial No. PCT/US05/47358, dated Jun. 13, 2007, 17 pages.
International Search Report, Application Serial No. PCT/US2004/06177, dated Jan. 31, 2005, 8 pages.
International Search Report, Application Serial No. PCT/US2005/47358, dated Feb. 9, 2007, 12 pages.
International Search Report, Application Serial No. PCT/US2006/39504, dated May 16, 2007, 17 pages.
Notice of Allowance, U.S. Appl. No. 11/025,849, dated Oct. 16, 2007, 4 pages.
Office Action, U.S. Appl. No. 10/744,080, dated Mar. 6, 2009, 36 pages.
Office Action, U.S. Appl. No. 10/927,091, dated Apr. 15, 2009, 21 pages.
Office Action, U.S. Appl. No. 10/927,091, dated Apr. 4, 2008, 20 pages.
Office Action, U.S. Appl. No. 10/927,091, dated Oct. 17, 2008, 23 pages.
Office Action, U.S. Appl. No. 11/025,849, dated Jan. 18, 2007, 17 pages.
Office Action, U.S. Appl. No. 11/025,849, dated May 1, 2007, 15 pages.
Supplementary European Search Report, Application Serial No. 05 85 5851, dated Nov. 18, 2009, 6 pages.
Supplementary European Search Report, International Publication No. WO/2006/074040, dated Jul. 13, 2006, 48 pages.
USPTO, Non-final Office Action for U.S. Appl. No. 15/412,819, dated Jun. 22, 2017, 5 pages.
USPTO, Non-final Office Action for U.S. Appl. No. 15/412,819, dated Jun. 5, 2017, 6 pages.
USPTO Notice of Allowance for U.S. Appl. No. 15/412,819, dated Oct. 5, 2017, 10 pages.
USPTO, Final Office Action for U.S. Appl. No. 10/744,080, dated Feb. 12, 2008, 29 pages.
USPTO, Final Office Action for U.S. Appl. No. 10/744,080, dated May 23, 2008, 28 pages.
USPTO, Final Office Action for U.S. Appl. No. 13/010,046, dated Apr. 27, 2011, 6 pages.
USPTO, Final Office Action for U.S. Appl. No. 13/010,046, dated Apr. 5, 2012, 11 pages.
USPTO, Final Office Action for U.S. Appl. No. 13/757,015, dated Apr. 14, 2014, 10 pages.
USPTO, Non-Final Office Action for U.S. Appl. No. 10/744,080, dated Aug. 20, 2007, 24 pages.
USPTO, Non-Final Office Action for U.S. Appl. No. 12/022,437, dated Mar. 26, 2010, 16 pages.
USPTO, Non-Final Office Action for U.S. Appl. No. 13/010,046, dated Oct. 18, 2011 9 pages.
USPTO, Non-Final Office Action for U.S. Appl. No. 13/757,015, dated Aug. 4, 2014, 11 pages.
USPTO, Non-Final Office Action for U.S. Appl. No. 13/757,015, dated Sep. 13, 2013, 9 pages.
USPTO, Non-final Office Action for U.S. Appl. No. 14/954,898, dated Feb. 22, 2016, 5 pages.
USPTO, Notice of Allowance for U.S. Appl. No. 10/927,091, dated Nov. 30, 2010, 31 pages.
USPTO, Notice of Allowance for U.S. Appl. No. 12/022,437, dated Sep. 15, 2010, 38 pages.
USPTO, Notice of Allowance for U.S. Appl. No. 13/010,046, dated Oct. 4, 2012, 13 pages.
USPTO, Notice of Allowance for U.S. Appl. No. 13/757,015, dated Aug. 4, 2015, 10 pages.
USPTO, Notice of Allowance for U.S. Appl. No. 14/954,898, dated Sep. 12, 2016, 8 pages.
USPTO, Supplemental Non-final Office Action for U.S. Appl. No. 10/744,080, dated Aug. 4, 2008, 32 pages.
U.S. Appl. No. 15/842,830, filed Dec. 14, 2017.
IN Order in Indian Appln. No. 5429/DELNP/2007, dated Nov. 27, 2019, 4 pages.

* cited by examiner

675

Which Instant Messaging sessions
do you want to refresh?

| All |

Co-User

| Friend 2 |

| Mom |

FIG. 6B

MANAGING INSTANT MESSAGING SESSIONS ON MULTIPLE DEVICES

CROSS-REFERENCE TO RELATED APPLICATIONS

This application is a continuation of and claims priority to U.S. patent application Ser. No. 15/842,830, filed Dec. 14, 2017. U.S. patent application Ser. No. 15/842,830 is a continuation of U.S. patent application Ser. No. 15/412,819, filed Jan. 23, 2017 (now U.S. Pat. No. 9,900,274). U.S. patent application Ser. No. 15/412,819 is a continuation of U.S. patent application Ser. No. 14/954,898, filed Nov. 30, 2015 (now U.S. Pat. No. 9,553,830). U.S. patent application Ser. No. 14/954,898 is a continuation of and claims priority to U.S. patent application Ser. No. 13/757,015, filed Feb. 1, 2013 (now U.S. Pat. No. 9,210,109). U.S. Pat. No. 13/757,015 is a continuation of and claims priority to U.S. patent application Ser. No. 13/010,046, filed Jan. 20, 2011 (now U.S. Pat. No. 8,370,429). U.S. patent application Ser. No. 13/010,046 is a continuation of and claims priority to U.S. application patent Ser. No. 12/022,437, filed Jan. 30, 2008 (now U.S. Pat. No. 7,877,450). U.S. patent application Ser. No. 12/022,437 is a continuation of and claims priority to U.S. patent application Ser. No. 11/025,849, filed Dec. 30, 2004 (now U.S. Pat. No. 7,356,567). Each of the above-referenced applications is incorporated by reference to its entirety.

TECHNICAL FIELD

This document relates to managing instant messaging sessions on multiple devices.

BACKGROUND

Instant messaging is one manner in which online identities may communicate with each other electronically. A user may be able access an instant messaging online identity multiple times from multiple different devices. For example, the user may log into the user's instant messaging online identity through an instant messaging application on the user's desktop personal computer at home. At the same time, the user may log into the same instant messaging online identity through an instant messaging application on the user's personal digital assistant.

Unlike email that is persistent, instant messaging is intended to enable ongoing and continuous, though segmented, dialog between two users substantially in real time. As such, an instant messaging user interface appears on a device use to inspire or receive an instant message, reflecting content presently sent or received by the instant messaging participants.

If two or more instant messaging controllers concurrently are run by a single online identity, an instant messaging user interface will appear on both controllers each time an instant message is received by that identity, whether or not the identity is actively operating devices at which those controllers are run.

Moreover, when a user inspires a message, their message appears only on the instant messaging user interface of the device from which the message was inspired. For example, if a user concurrently runs an instant messaging controller on a desktop and a personal digital assistant (PDA), and the user inspires a message using the instant messaging controller on the desktop, the instant messaging user interface does not appear on the PDA to reflect the instant message sent by the user from the desktop.

When a reply to the user's instant message is received, and it inspires an instant messaging user interface on both devices, the PDA interface remains without an indication of the message that the user sent to inspire the reply.

DESCRIPTION OF DRAWINGS

FIG. 6B illustrates an exemplary selection interface.

Like reference symbols in the various drawings may indicate like elements.

DETAILED DESCRIPTION

Figure 1:
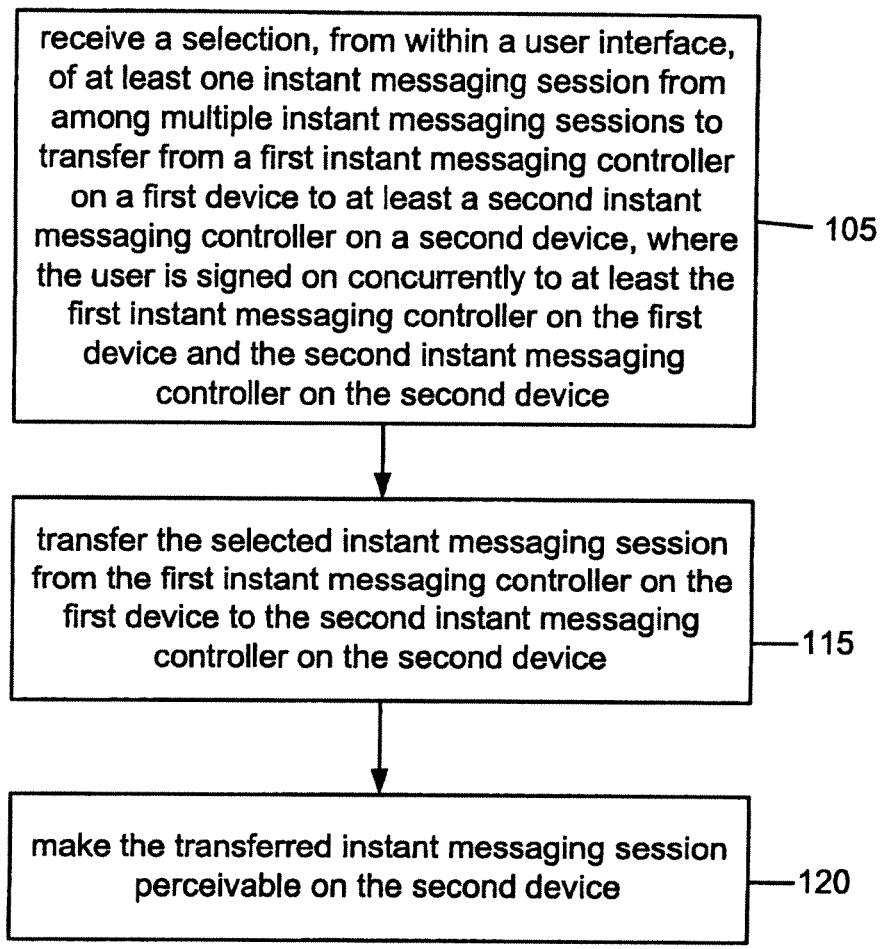
FIG. 1 is a flow chart of an exemplary process for enabling a user to transfer an instant messaging session.

In a world of ubiquitous device usage and portability, it becomes important to intelligently manage instant messaging conversation content presented at devices concurrently logged into an instant messaging service. One aspect of intelligent management involves replicating or transitioning information related to ongoing instant messaging conversations from an incumbent instant messaging controller to another instant messaging controller that has newly been run, automatically or in response to user input. Another aspect involves managing presentation of information and multiple concurrently running instant messaging controllers in an ongoing basis.

More specifically, convenient access to the content (and/or bibliographic information) for current instant messaging conversations across multiple instant messaging controllers on different devices may be provided in several ways. In one exemplary implementation, a user is allowed to transfer (e.g., copy or transition) one or more current instant messaging sessions from among multiple instant messaging sessions from an instant messaging controller on one device to an instant messaging controller on another device. For instance, a user may sign on to an instant messaging system using an online identity (e.g., screen name) on an instant messaging controller on a desktop computer. The user may have multiple instant messaging sessions with multiple different co-users. If the user needs to leave the desktop computer and desires to continue a subset of those multiple instant messaging sessions, then the user may log on to an instant messaging controller on another device, such as a personal digital assistant (PDA), and transfer a subset of the multiple instant messaging sessions to the PDA. The full text of the transferred instant messaging sessions are made perceivable on the PDA, thus, enabling the user to seamlessly continue the existing instant messaging conversations by referencing some or all of the text of the conversation communicated prior to their logging onto the instant messaging controller on the PDA.

In one exemplary implementation, the user may initiate the transfer of all or a subset of the ongoing instant messaging session from either the instant messaging controller on the incumbent device or the instant messaging controller on the later-invoked device. Thus, in the example discussed above, the user may initiate the transfer of the instant messaging sessions from either the instant messaging controller on the desktop computer or the instant messaging controller on the PDA.

Different user interfaces may be used to transfer the instant messaging sessions. In one exemplary implementation, an instant messaging session transfer interface may be used to transfer one or more instant messaging sessions from among multiple instant messaging sessions. The instant messaging session transfer interface may be accessed and used from either the instant messaging controller on the incumbent device or the instant messaging controller on the later-invoked device. In another exemplary implementation, an instant messaging conversation interface may be configured to enable transfer of a corresponding instant messaging session.

In addition to selecting the particular instant messaging sessions to transfer, the user also may select the device to receive or send the instant messaging sessions. For example, if the user is signed on to three instant messaging controllers on three different devices, then the user may select which of two devices to send one or more (or all) instant messaging sessions. Additionally and/or alternatively, the user may select which of two devices from which to receive one or more (or all) instant messaging sessions.

When an instant messaging session is perceivable on more than one instant messaging controller, the exchange of instant messages between the user and the co-user in instant messaging session may be mirrored on all or less than all of the instant messaging controllers. The user may designate preferences as to whether the instant messaging sessions should be mirrored prior to and/or after the transfer.

In one exemplary implementation, an idle or an away state of the instant messaging controller may disrupt the viewing of a mirrored instant messaging session. When the user returns to a device where the display of the instant messaging session was interrupted due to an idle or an away state, the interrupted instant messaging session may be refreshed. In one implementation, the display of the interrupted instant messaging session may be refreshed automatically upon the instant messaging controller transitioning into an active state. In another exemplary implementation, an interface may be used to designate which of the one or more interrupted instant messaging sessions to refresh.

In yet another exemplary implementation, when an instant messaging session is transferred back to a device, the legacy instant messaging conversation interface may be refreshed with the entire instant messaging session or the legacy instant messaging conversation interface may be closed and a new instant messaging conversation interface instantiated and populated with the entire instant messaging conversation.

FIG. 1 illustrates an exemplary process 100 for transferring an instant messaging session. A selection is received identifying at least one instant messaging session from among multiple instant messaging sessions to be transferred from a first instant messaging controller on a first device to at least a second instant messaging controller on a second device, where the user is signed on concurrently to at least the first instant messaging controller on the first device and the second instant messaging controller on the second device (step 105). The selected instant messaging session is transferred from the first instant messaging controller on the first device to the second instant messaging controller on the second device (step 115) and the transferred instant messaging session is made perceivable on the second instant messaging controller on the second device (step 120).

An instant messaging session is a communication session that is established between a user and at least one co-user, where the user and the co-user can exchange instant messages in an instant messaging conversation interface. A user may have multiple instant messaging session ongoing at the same time with many different co-users, with each separate instant messaging conversation being made perceivable to the user in a corresponding instant messaging conversation interface.

An instant messaging session may be established using an instant messaging controller and a device. An example of a device is a general-purpose computer capable of responding to and executing instructions in a defined manner. Other examples include a special-purpose computer, a personal computer ("PC"), a workstation, a server, a laptop, a cellular communications device, a Web-enabled telephone, a personal digital assistant ("PDA"), a Web-enabled PDA, an interactive television set, a settop box, a video tape recorder ("VTR"), a DVD player, an on-board (i.e., vehicle-mounted) computer, or any other component, machine, tool, equipment, or some combination thereof capable of responding to and executing instructions.

An example of a controller, including an instant messaging controller, is a software application (e.g., operating system, browser application, micro browser application, server application, proxy application, gateway application, tunneling application, e-mail application; instant messaging client, online service provider client application, interactive television client application, and/or Internet service provider client) loaded on a device to command and direct communications enabled by the device. Other examples include a computer program, a piece of code, an applet, a Java applet, a script, an instruction, another device, or some combination thereof for independently or collectively instructing the device to interact and operate as desired. The controller may be embodied permanently or temporarily in any type of machine, component, physical or virtual equipment, storage medium, or propagated signal capable of providing instructions to a device. In particular, the controller (e.g., software application, computer program) may be stored on a storage media or device (e.g., ROM, magnetic diskette, or propagated signal) readable by a general or special purpose programmable computer, such that if the storage media or device is read by a computer system, the functions described herein are performed.

Typically, a user is associated with an instant messaging online identity. The instant messaging online identity may be maintained at a remote location by an instant messaging service provider. In one implementation, a user may subscribe to an instant messaging online identity with a commercial instant messaging service provider, such as those provided by America Online, Inc., Yahoo, Inc., Microsoft, Inc., and other instant messaging service providers. In another implementation, a user may be a part of an enterprise instant messaging service and may have an instant messaging online identity as part of the enterprise system, such as a corporate instant messaging service. In some cases, the instant messaging online identity may be part of both a commercially available instant message service provider and an enterprise instant message provider. In another implementation, the user may have an instant messaging online identity in a point-to-point ("P2P") instant messaging system.

The instant messaging online identity may be used to access one or more features or services, for example, through submission of the online identity and an associated password. The online identity may include a set of alphanumeric characters, symbols, tokens, or other types of online identities. In one implementation, a screen name may be used as the online identity.

The instant messaging online identity typically is associated with information related to the user, such as a user's profile. The user's profile may include the user's preferences and a user-defined list of other co-users or co-subscribers, which may be called a user's buddy list.

In general, a user's buddy list may be maintained with or accessible as part of a user's profile and may be made accessible using a user interface (VI) that provides the online status and capabilities of certain screen names, i.e., "buddies," identified by the user. In particular, the instant message service provider may inform the user whether or not identified buddies are online, i.e., currently accessing the instant messaging service provider, enterprise host, or PTP node, as the case may be. The instant message service provider also informs any other user who has identified the user as a buddy that the user is currently online.

A buddy list may be used to facilitate instant messaging communications between users. For example, a user can activate an instant messaging user interface that is pre-addressed to a buddy simply by selecting the screen name of an online buddy from the buddy list.

Alternatively, by way of example, if a recipient is not a "buddy," the first user generally initiates instant messaging communications by activating a blank instant messaging conversation interface and then addressing that interface to the online identity (e.g., screen name) of the intended recipient. When necessary, a user may look up the screen name of an intended recipient using the intended recipient's e-mail address or other means.

Figure 2:
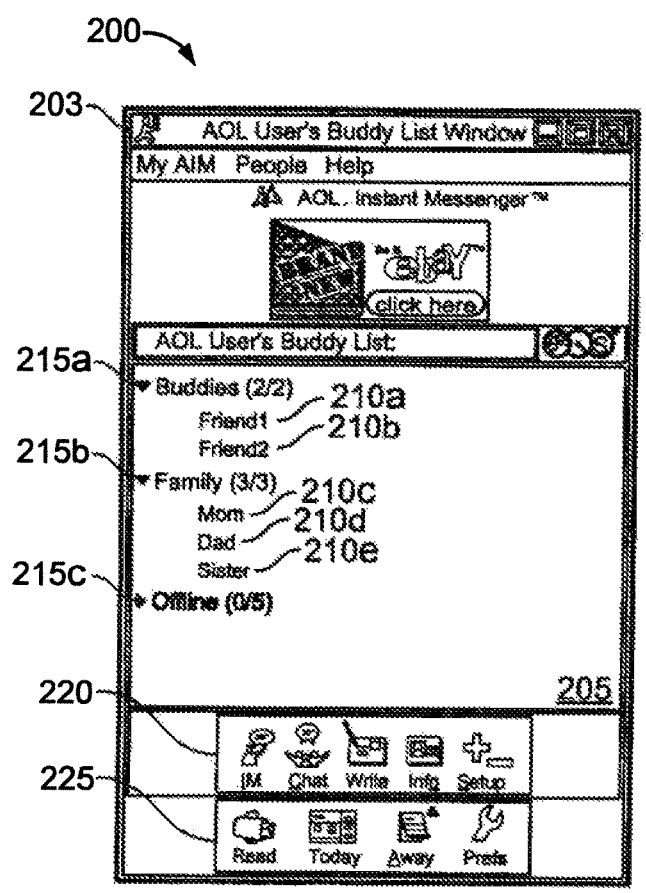
FIG. 2 is an exemplary screen shot of a participant list.

For example, the participant list may include a "buddy list" that lists other co-users of one or more instant messaging systems. FIG. 2 illustrates an exemplary buddy list 200. A buddy list interface 200 for a given user displays the screen names of user-defined co-users of an instant messaging system with which the given user regularly communicates. The co-users form a buddy list for the given user. Communications with one of the co-users may be initiated through selection of the corresponding identifier (e.g., screen name) for the co-user from the buddy list. The co-users may have been added to the buddy list by the given user manually using identifiers of the co-users in the instant messaging system that are known to the given user at the time of addition.

The buddy list interface 200 includes a text box 20S that contains the buddy list for the given user, who is identified by a screen name "AOLUser," as indicated in the title bar 203 of the buddy list interface 200. The buddy list in the buddy list interface 200 includes multiple screen names 210a-210e. More particularly, the buddy list includes the screen name "Friend1" 210a, the screen name "Friend2" 210b, the screen name "Mom" 210c, the screen name "Dad" 210d, and the screen name "Sister" 210e.

The screen names within the buddy list shown by buddy list interface 200 are organized into multiple buddy groups 215a-215c. Each screen name within the buddy list is associated with at least one of the buddy groups 215a-215c. The buddy list includes a "Buddies" buddy group 215a, a "Family" buddy group 215b, and an "Offline" buddy group 215c. The screen name 210a appears below the heading for the buddy group 215a because the screen name 210a has been associated with the buddy group 215a and the corresponding user is present, that is, logged into the instant messaging system and available to send and receive instant messages. The heading for each of the buddy groups 215a and 215b indicates the number of buddies in the group currently logged into the instant messaging system, as well as the total number of buddies in the group. For example, two out of the two members of the buddy group 215a are logged into the instant messaging system for which the buddy list interface 200 is displayed. Similarly, the heading for the "Offline" buddy group 215c indicates the number of other users on the buddy list that are not logged into the system (i.e., 0) and the total number of buddies on the buddy list (i.e., 5). Typically, when users log into the instant messaging system, screen names of the users are moved from the "Offline" buddy group 215c to one of the other buddy groups 215a or 215b.

The buddy list interface 200 also includes controls 220 that enable the given user to communicate with the co-users corresponding to the screen names 210a-210c. For example, the given user may send instant messages, chat invitations, or e-mail messages to the communications identities referenced in the buddy list through use of the controls 220. The controls 220 also enable the user to obtain information describing the co-users, as well as to modify the set of co-users referenced in the buddy list interface 200.

The buddy list interface 200 includes controls 225 that enable the given user to access other information not directly related to sending and receiving instant messages. For example, the given user may use the controls to access e-mail messages or other special features of the instant messaging system. The given user also may use the controls 225 to modify preferences for the buddy list interface 200.

Figure 3A:
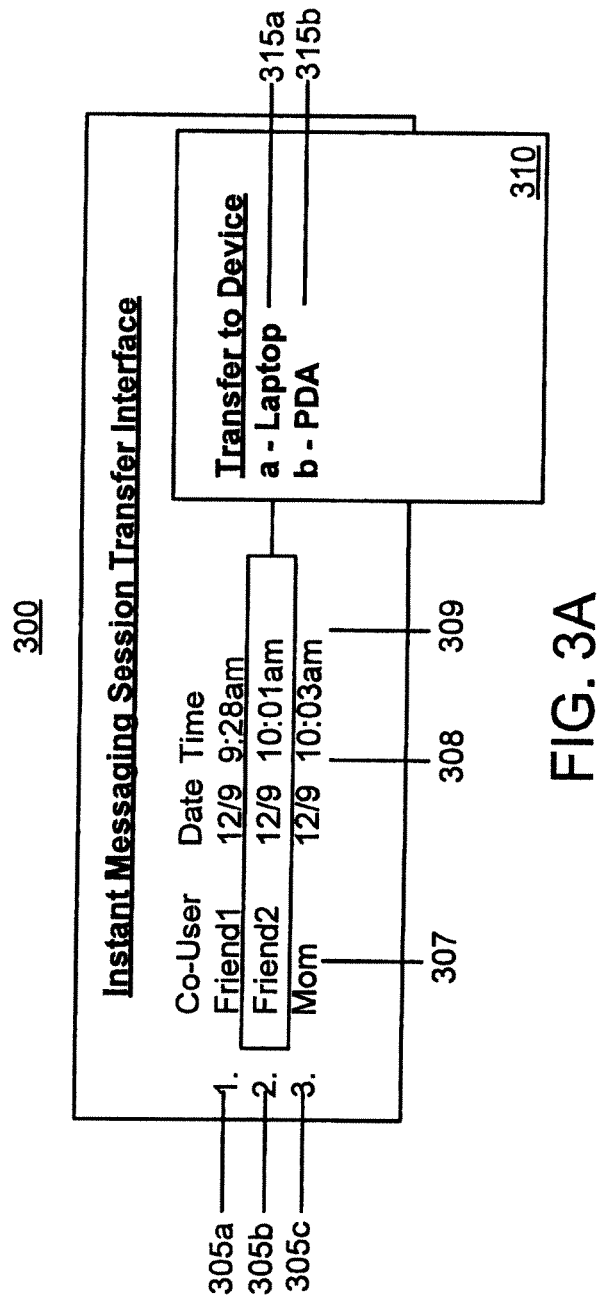
FIGS. 3A-3C are exemplary screen shots illustrating an instant messaging session transfer interface.

Different interfaces may be used to enable the transfer of instant messaging sessions from a first instant messaging controller on one device to a second instant messaging controller on a second device. The interfaces enable the user to select a subset of the instant messaging sessions to transfer from among multiple instant messaging sessions. Referring to FIG. 3A, an instant messaging session transfer interface 300 is illustrated. The instant messaging session transfer interface 300 includes a listing of the current instant messaging sessions 305a-305c. The current instant messaging sessions 305a-305c may be presented with corresponding metadata-type or bibliographic information such as, for example, the co-user's online identity or alias (e.g., screen name) 307, the date the instant messaging session was opened 308, and the time the instant messaging session started 309. Other metadata-type or bibliographic information also may be maintained and made perceivable to the user to identify a particular instant messaging session. Other metadata-type or bibliographic information may include the duration of the instant messaging session, the state of the co-user (e.g., active, idle, or away), and keywords from the session.

In the case where the user is only signed in to one other instant messaging controller on one other device, when the user selects one or more of the instant messaging sessions for transfer (step 105) the selected instant messaging sessions are transferred to the instant messaging controller on that device (step 115). However, if the user is signed on to more than one other instant messaging controller on more than one other device, a device selection box 310 is presented to the user so the user can select which device or devices 315a and 315b to transfer the selected instant messaging sessions.

FIG. 3A illustrates an exemplary implementation of the user initiating the transfer of the instant messaging sessions from the instant messaging controller on an incumbent device at which the listed instant messaging sessions currently are made perceivable and from which those sessions may be transferred responsive to user manipulation of the interface. In this example, the user has selected to transfer the instant messaging session 305b with Friend2. Since the user is signed on to multiple other devices, a device selection box 310 is presented to the user to enable the user to select either or both of the devices 315a and 315b to send the instant messaging session. For instance, the user may be conducting the instant messaging session with Friend2 from an instant messaging controller on a desktop computer. If the user has to walk away from the desktop computer but still wants to continue the instant messaging session with Friend2 on the user's PDA (as opposed to their laptop), then the user selects PDA 315b from the device selection box 310. The selected instant messaging session 305b is transferred to the instant messaging controller on the PDA (step 115) and the instant messaging session is made perceivable using the instant messaging controller on the PDA (step 120). When the instant messaging session is transferred, the instant messaging controller on the PDA receives the entire session history including some or all of the text of conversation between the user and Friend2. In one exemplary implementation, a new instant messaging conversation interface is instantiated on the instant messaging controller on the PDA and the conversation interface is populated with the transferred instant messaging session.

In one exemplary implementation, the user may designate a portion of the text of the instant message that is to be transferred. For example, upon initiating the transfer of an instant messaging session, the text of the session may be presented to the user. The user may select all or a portion of the text to transfer by highlighting the desired using a cursor control device. The designated text is then transferred to the instant messaging controller on the later-invoked device.

Figure 3B:
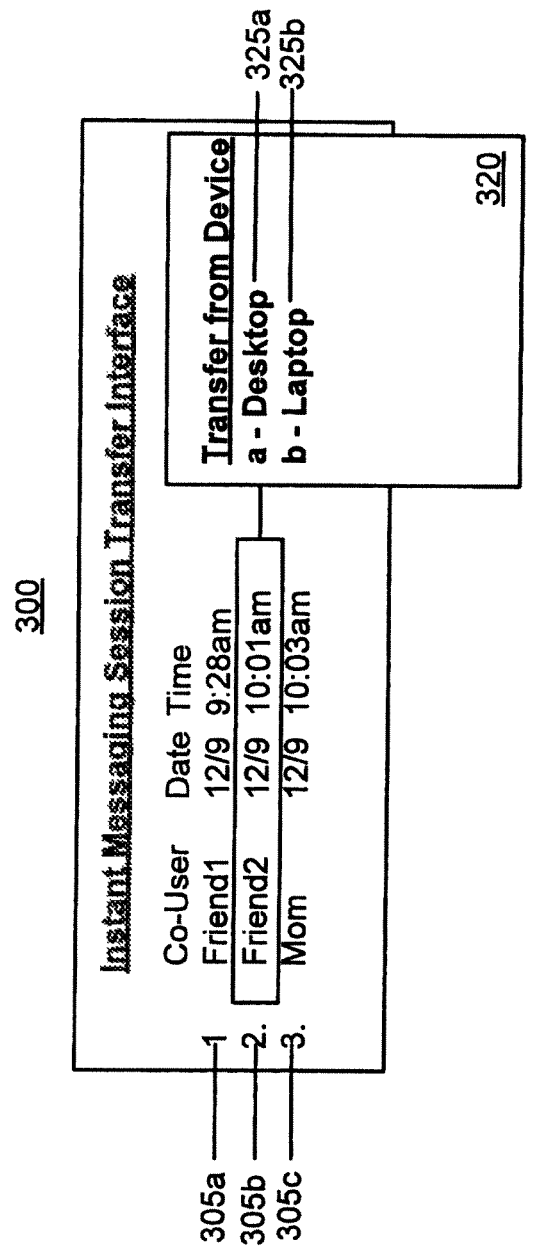

FIG. 3B illustrates the exemplary implementation of the user initiating the transfer of the instant messaging sessions from the instant messaging controller on the later-invoked device that is going to receive the transferred instant messaging sessions from one or more other instant messaging controllers on other devices. An instant messaging session transfer interface 300 includes a listing of the current instant messaging sessions 305a-305c identified by metadata or bibliographic-type information. The transfer interface 300 enables the user to select one or more of the instant messaging sessions 305a-305c to receive. The transfer interface 300 also may include a device selection box 320 to enable the user to select the device 325a or 325b from which to receive the selected instant messaging session if the session is mirrored at multiple other instant messaging controllers on multiple other devices 325a and 325b.

Enabling the user to select the device 325a or 325b from which to receive the selected instant messaging session may be advantageous, for example, if one of the devices 325a or 325b has a more complete instant messaging session than the other device. For instance, laptop 325b may only have a partial instant messaging session 305b because the instant messaging controller on the laptop 325b was launched after the instant messaging session had begun on the instant messaging controller on the desktop 325a. In one exemplary implementation, the device with the most complete instant messaging session may be distinguished from other devices using a visual identifier. Additionally or alternatively, the device with the most complete instant messaging session may be auto-selected for use in the transfer.

Figure 3C:
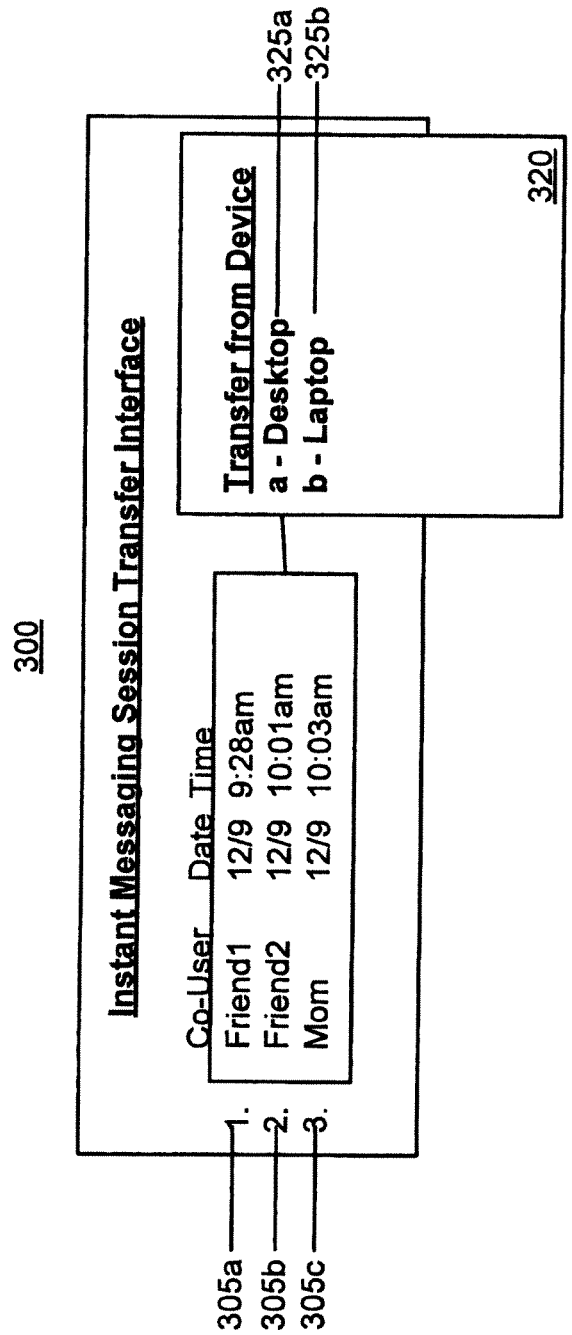

Enabling the user to initiate the transfer of a subset of instant messaging sessions from among multiple instant messaging sessions from the receiving instant messaging controller on the later-invoked device is advantageous, for example, in the event the user walks away from the device where the instant messaging session was taking place. For example, if the user was conducting an instant messaging session with Friend2 305b from his desktop computer 325a and the user walked away from the desktop computer 325a before transferring the instant messaging session to his PDA, then the user could still initiate the transfer of the session from the PDA to enable continued participation in or review of the conversation from the user's PDA FIG. 3C illustrates an exemplary implementation of the user initiating the transfer of more that one or all of the current instant messaging sessions. An instant messaging transfer interface 300 includes a listing of the current instant messaging sessions 305a-305c identified by metadata or bibliographic-type information. In this example, the user has selected all three of the current instant messaging sessions 305a-305c for transfer concurrently. The selection may be made using a cursor control device (e.g., a mouse) selection or manipulation or using radio button or checkbox selection (not shown). The transfer interface 300 also may include a device selection box 320 to enable the user to select the device 325a or 325b from which to receive the selected instant messaging session if the session is mirrored at multiple other instant messaging controllers on multiple other devices 325a and 325b.

The instant messaging transfer interfaces described above with respect to FIGS. 3A-3C may be triggered or invoked in different ways. For example, the transfer interfaces may be invoked manually by an input or an action of the user. For instance, the transfer interfaces may be invoked manually using a menu option on a toolbar within the instant messaging controller or by a right-click of a cursor control device that invokes a drop-down menu with an option to instantiate the transfer interface. In another exemplary implementation, the transfer interfaces may be invoked automatically based on a determined event, such as the user signing on to an instant messaging controller at another device for FIG. 3A or the device at which the transfer interface appears for FIGS. 3B and 3C.

Figure 4A:
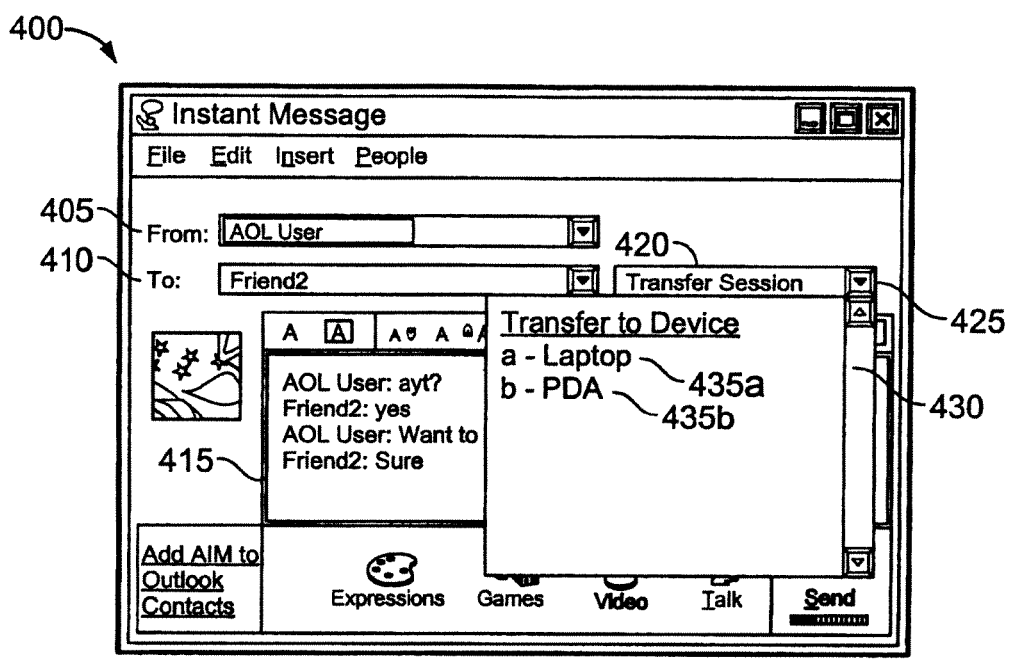
FIGS. 4A and 4B are exemplary screen shots illustrating aspects of an instant messaging conversation interface.

In another exemplary implementation, an instant messaging session may be transferred from one instant messaging controller on one device to another instant messaging controller on another device using an instant messaging conversation interface. FIG. 4A illustrates an instant messaging conversation interface 400 that is used to conduct an instant messaging session. The instant messaging conversation interface 400 includes a "From" portion 405 that lists the user who initiated the instant messaging session, a "To" portion 410 that lists the co-user with whom the user is exchanging instant messages, and an instant messaging conversation portion 415 that displays a chronological log of the instant messages exchanged between the user and co-user. The interface 400 also includes an instant messaging session transfer portion 420. The instant messaging session transfer portion 420 is configured to enable the user to select one or more devices with which to transfer some or all of the instant messaging session represented by the instant messaging conversation interface 400, which includes the transfer of the chronological log of instant messages exchanged between the user and the co-user. In one implementation, the instant messaging session transfer portion 420 includes a drop-down menu 425 that, when selected, reveals a scrollable window 430 that lists the devices 435a and 435b to which the instant messaging session can be transferred. In this example, the user is logged on to two other instant messaging controllers, one on a laptop 435*a* and one on a PDA 435*b*. If the user had been logged on to only one other device, the drop-down menu 425 and the scrollable window 430 may list just that one device or they may not list any devices at all and the instant messaging session may be transferred to the one device upon selection of the instant messaging transfer portion 420.

In another exemplary implementation, an instant messaging transfer portion and a drop-down menu in an instant messaging conversation interface may be used to select an instant messaging session to receive or pull into the conversation interface, where the instant messaging session currently resides only on other instant messaging controllers on other devices. The instant messaging transfer portion may appear only if the instant messaging session is available at the other instant messaging controller for transfer.

Figure 4B:
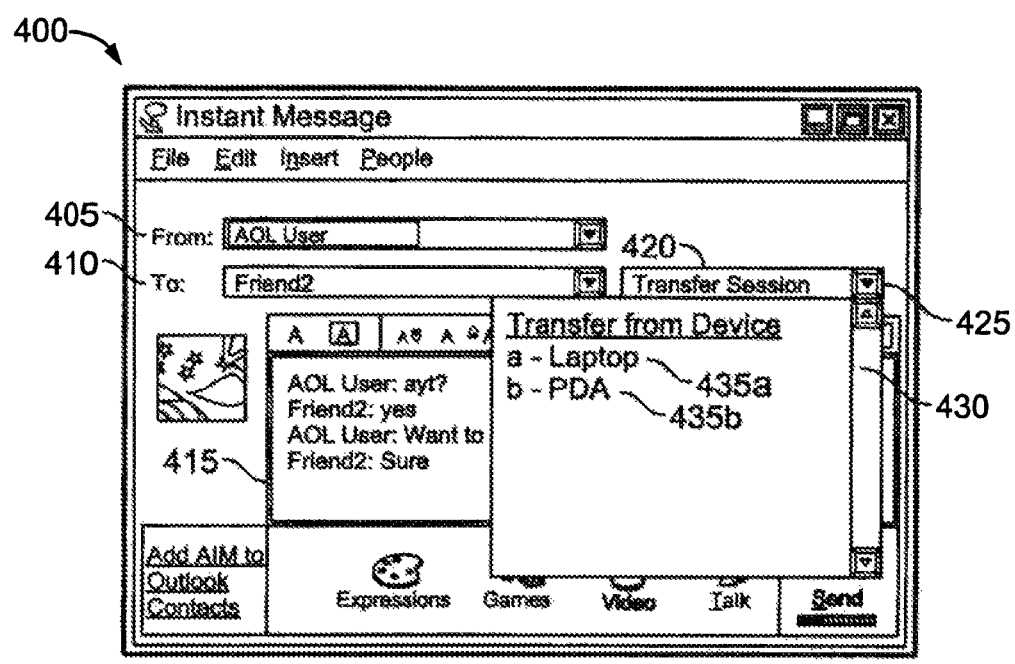

Referring to FIG. 4B, an instant messaging conversation interface 400 includes a "From" portion 405 that lists the user who initiated the instant messaging session, a "To" portion 410 that lists the co-user with whom the user is exchanging instant messages, and an instant messaging conversation portion 415 that displays a chronological log of the instant messages exchanged between the user and co-user. The interface 400 also includes an instant messaging session transfer portion 420. The instant messaging session transfer portion 420 is configured to enable the user to select one or more devices from which to receive some or all of an instant messaging session into the conversation interface 400, which includes receiving the chronological log of instant messages exchanged between the user and the co-user. The received instant messaging session is populated in the instant messaging conversation portion 415. The transfer portion 420 may only be enabled and/or made perceivable if the instant messaging session is available at the other instant messaging controller for transfer. In this example, the user is logged on to two other instant messaging controllers, one on a laptop 435*a* and one on a PDA 435*b*. If the user had been logged on to only one other device, the drop-down menu 425 and the scrollable window 430 may list just that one device or they may not list any devices at all, and the instant messaging session may be received from the one device upon selection of the instant messaging transfer portion 420.

Figure 5A:
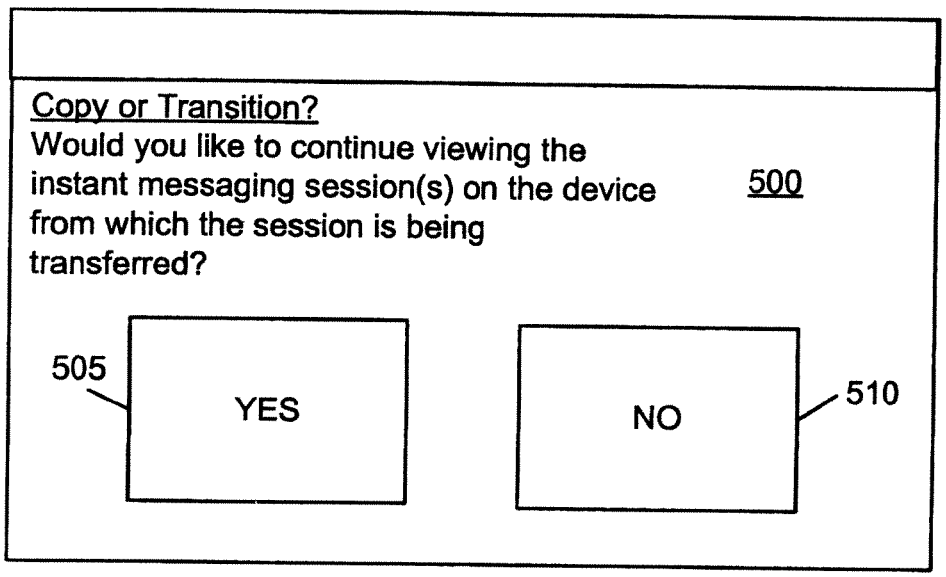
FIGS. 5A and 5B are exemplary interfaces of instant messaging session mirror request interfaces.

In one exemplary implementation, the user may designate preferences as to which instant messaging sessions are "mirrored." For instance, when an instance messaging session has been transferred to another instant messaging controller on another device, the text of the continued instant message exchange between the user and the co-user may be perceivable on both the device that sent the instant messaging session and the device that transferred the instant messaging session. However, the user may not desire to have the conversation continue to be made perceivable on the incumbent device. Either prior to or after the transfer of the instant messaging session the user may be presented with an interface that requests whether the user wants to continue the mirrored conversation on the incumbent device. Referring to FIG. 5A, an interface 500 is displayed which requests whether the user wants to have the instant messaging session continue on the device from which the instant messaging session is being transferred. If the user selects the "Yes" button 505, then the instant messaging session continues to be made perceivable on the device that sent the instant messaging session. If the user selects the "No" button 510, then the instant messaging session is no longer made perceivable on the device that sent the instant messaging session.

Figure 5B:
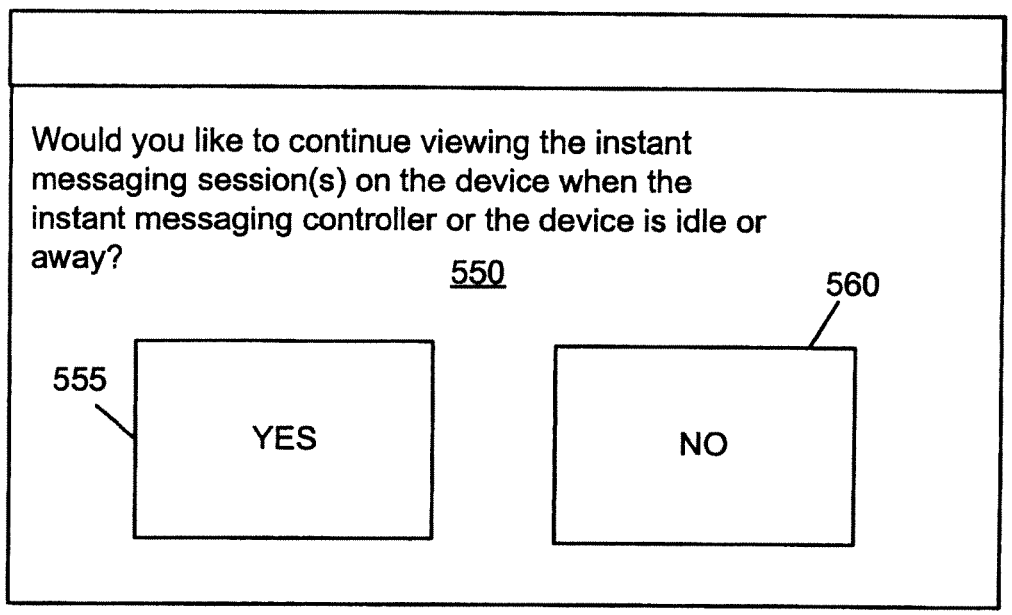

In one exemplary implementation, when an ongoing instant messaging session is made perceivable on more than one instant messaging controller on more than one device, the instant messaging session may no longer be made perceivable if the state of the instant messaging controller and/or the device is idle or away. An idle state is when the user has not been active on the instant messaging controller or the device for a configurable period of time. An away state is when the user manually sets the instant messaging controller in a non-active state. The user may set preferences regarding whether to continue mirroring transferred instant messaging sessions during an idle and/or an away state. Referring to FIG. 5B, an interface 550 is displayed to solicit feedback to indicate whether the user wants to continue viewing the instant messaging session after an idle or an away state. If the user selects the "Yes" button 555, then the instant messaging session continues to be made perceivable on the device even when the instant messaging controller and/or the device is in an idle or an away state. If the user selects the "No" button 560, the instant messaging session ceases being perceivable when the instant messaging controller and/or the device is in an idle or an away state. Thus, the instant messaging session may continue to be mirrored and perceivable on the device until they are interrupted by an idle or an away state at which time the instant messaging session is no longer made perceivable.

In another exemplary implementation, the user may configure global settings specify on a session-by-session basis that apply to more than one session. For example, the user may specify a global setting that all transferred instant messaging sessions are to be copied or conversely that all transferred instant messaging sessions are to be transitioned and, therefore, not copied. Moreover, a user may want to set up global preferences on a device-by-device basis such that, for example, transfers to a PDA default to transition while transfers from PDA merely copy.

Figure 6A:
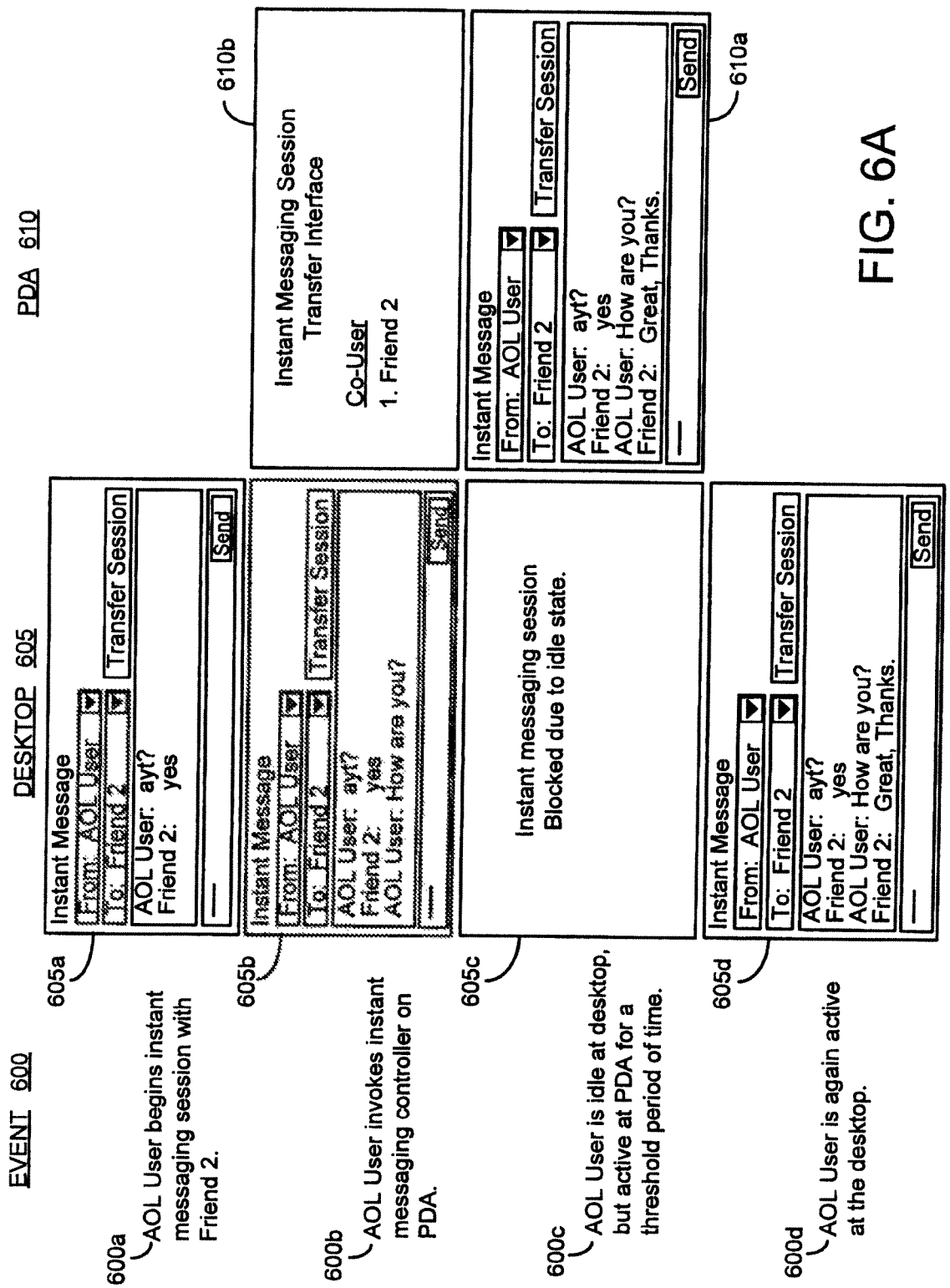
FIG. 6A illustrates an exemplary timeline.

Referring to FIG. 6A, an exemplary timeline is illustrated for the refreshing of an instant messaging session when returning from an idle state. The timeline includes an event column 600, a desktop user interface column 605 and a PDA user interface column 610. The first event is when the online identity, AOL User, is logged onto an instant messaging controller on a desktop computing device and begins and instant messaging session with co-user, Friend2 (600*a*). The user interface on the desktop (605*a*) displays an instant messaging conversation interface with a disabled transfer session button. The transfer session button is disable because AOL User is only signed on to one instant messaging controller and there are no other instant messaging controllers available to transfer the instant messaging session. The instant messaging conversation interface portion displays the text of the instant messaging session.

Next, AOL User invokes the instant messaging controller on the PDA (600*b*). The instant messaging conversation interface (605*b*) now display an enabled transfer session button because another instant messaging controller is available to transfer the instant messaging session with Friend2. The conversation interface portion continues to display the ongoing conversation of the instant messaging session. The PDA displays an instant messaging session transfer interface 61 ~b, which lists the instant messaging session with Friend2 as available for transfer to the PDA. In one exemplary implementation, the desktop (605) may display an instant messaging session transfer interface (not shown) that enables AOL User to transfer this instant messaging session with Friend2 as well as other instant messaging sessions with other co-users. The user transfers the instant messaging session to the PDA so that the instant messaging session is mirrored on both the desktop and the PDA.

When AOL User is idle at the desktop but active at the PDA for a threshold period of time (600c), the interface on the desktop (605c) indicates that the instant messaging session is blocked due to an idle state and in the instant messaging conversation interface (610c) on the PDA the instant messaging session conversation continues. In one exemplary implementation, the ongoing instant messaging session will not trigger or transition the desktop from the idle state to an active state. For instance, a host system setting may redirect messages from Friend2 only to the PDA once the desktop is in an idle state.

When AOL User returns to the desktop and the desktop is in an active state (600d), then the instant messaging conversation interface (605d) may be refreshed so that the entire conversation is perceivable on the desktop. In one exemplary implementation, when the instant messaging controller and/or the device returns to an active state, the instant messaging sessions may be refreshed automatically. In another exemplary implementation, the user may designate which of the one or more interrupted instant messaging sessions to refresh. Referring to FIG. 6B, an exemplary selection interface 675 illustrates one or more instant messaging sessions that the user may select on an individual or on a collective basis to refresh.

In yet another exemplary implementation, when an instant messaging session is transferred back to a device, the legacy instant messaging conversation interface may be refreshed with the entire instant messaging session or the legacy instant messaging conversation interface may be closed and a new instant messaging conversation interface instantiated and populated with the transferred back instant messaging window.

In one exemplary implementation, user-inspired messages may be made perceivable on all instant messaging controllers on all devices. This ensures that the user is able to view an entire instant messaging conversation of user-inspired messages and co-user messages on all of the instant messaging controllers and not just on the instant messaging controller from which the user is composing and sending the user-inspired messages.

Figure 7:
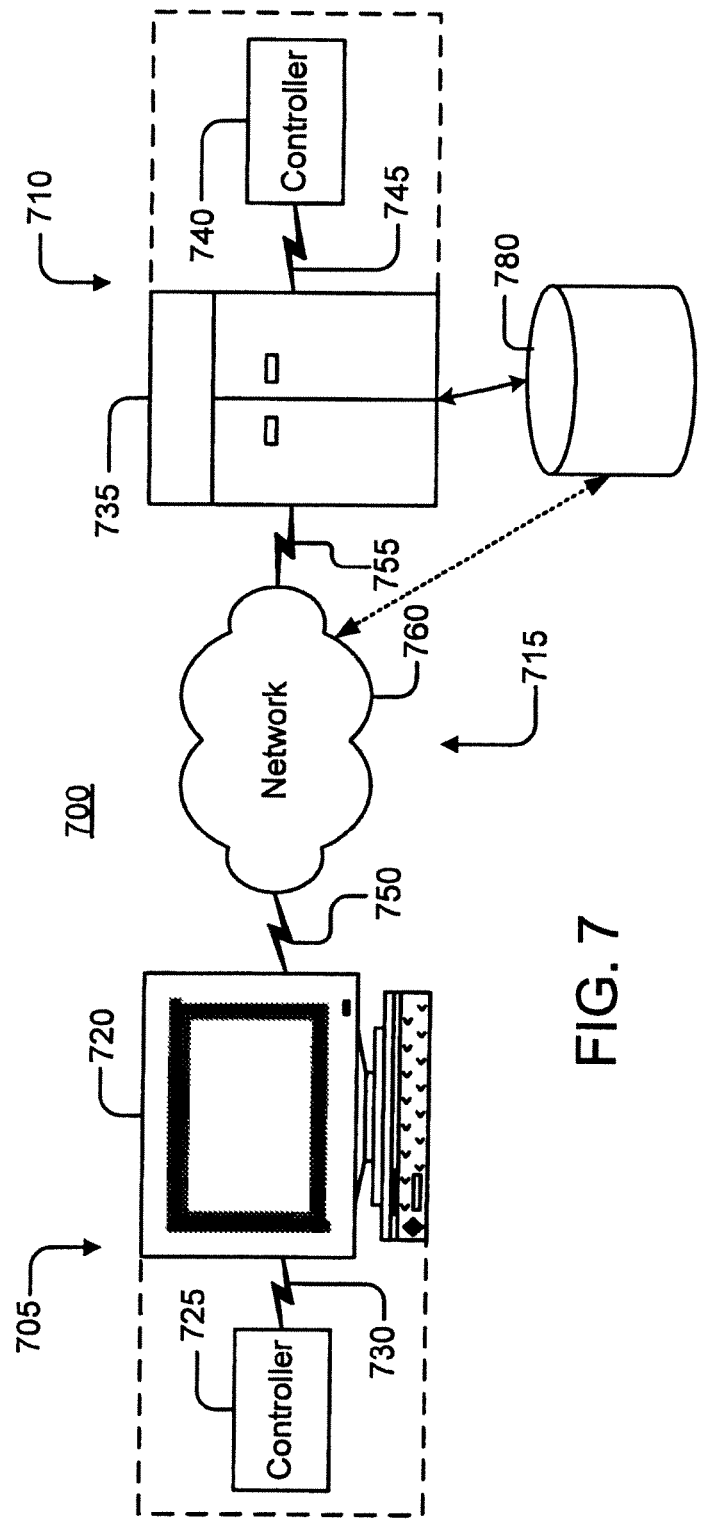
FIG. 7 is a block diagram of a communications system.
Figure 8:
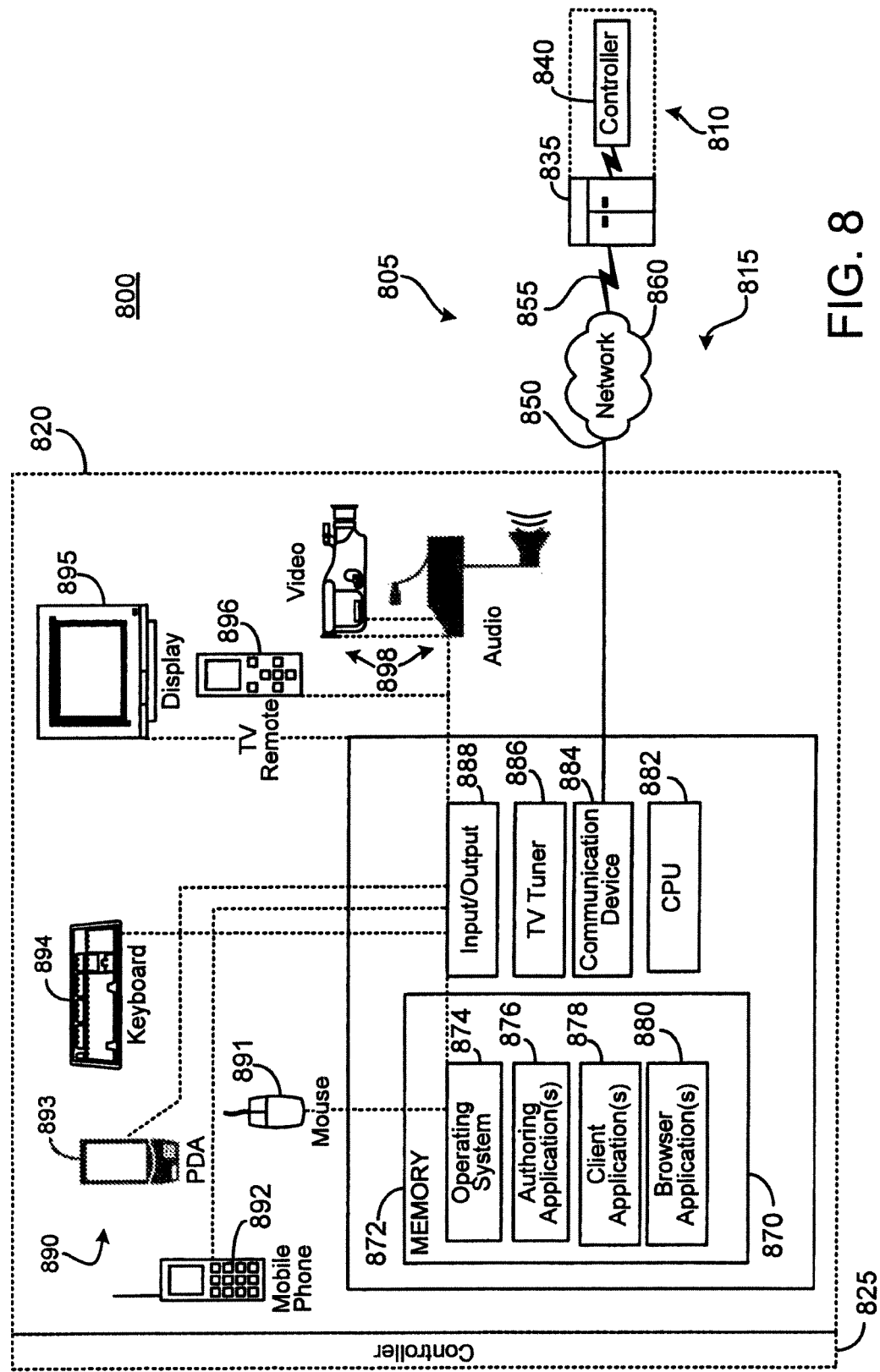
FIG. 8 is an expansion of the block diagram of FIG. 7.

FIGS. 7 and 8 illustrate an exemplary block diagram 700 and 800 of a communications system that may be used as part of the implementation of the features described above.

For illustrative purposes, FIGS. 7 and 8 show an example of a communications system for implementing techniques for transferring electronic data, including instant messages. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 7, a communications system 700 is capable of delivering and exchanging data between a user system 705 and a provider system 710 through a communications link 715. The user system 705 may include a client system and the provider system 710 may include a host system. The user system 705 typically includes one or more user devices 720 and/or user controllers 725, and the provider system 710 typically includes one or more provider devices 735 and/or provider controllers 740. For example, the user system 705 or the provider system 710 may include one or more general-purpose computers (e.g., personal computers), one or more special-purpose computers (e.g., devices specifically programmed to communicate with each other and/or the user system 705 or the provider system 710), or a combination of one or more general-purpose computers and one or more special-purpose computers. The user system 705 and the provider system 710 may be arranged to operate within or in concert with one or more other systems, such as, for example, one or more Local Area Networks ("LANs") and/or one or more Wide Area Networks ("WANs").

The provider system 710 may include a communication interface such as an electronic mail gateway. For instance, the provider system 710 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 710 enables communications between the provider system 710 and other systems through, for example, communications link 715.

The user device 720 (or the provider device 735) is generally capable of executing instructions under the command of a user controller 725 (or a provider controller 740). The user device 720 (or the provider device 735) is connected to the user controller 725 (or the provider controller 740) by a wired or wireless data pathway 730 or 745 capable of delivering data.

The user device 720, the user controller 725, the provider device 735, and the provider controller 740 each typically include one or more hardware components and/or software components. An example of a user device 720 or a provider device 735 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The user device 720 and the provider device 735 may include devices that are capable of peer-to-peer communications.

An example of a user controller 725 or a provider controller 740 is a software application loaded on the user device no or the provider device 735 for commanding and directing communications enabled by the user device no or the provider device 735. Other examples include a program, a piece of code, an instruction, a device, a computer, a computer system, or a combination thereof, for independently or collectively instructing the user device 720 or the provider device 735 to interact and operate as described. The user controller 725 and the provider controller 740 may be embodied permanently or temporarily in any type of machine, component, physical or virtual equipment, storage medium, or propagated signal capable of providing instructions to the user device 720 or the provider device 735.

The communications link 715 typically includes a delivery network 760 making a direct or indirect communication between the user system 705 and the provider system 710, irrespective of physical separation. Examples of a delivery network 760 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 715 may include communication pathways 750 and 755 that enable communications through the one or more delivery networks 760 described above. Each of the communication pathways 750 and 755 may include, for example, a wired, wireless, cable or satellite communication pathway.

An electronic information store 780 may be connected to the provider system 710, included as a component of the provider system 710, and/or connected to the delivery network 760. The electronic information store 780 may be a repository for electronic information that may be in an indexed and/or searchable format. For example, in one implementation, the electronic information store 780 may be used to store information related to instant messaging online identities. In another exemplary implementation, electronic information store 780 may be used to record and to store instant messaging history sessions.

FIG. 8 illustrates a communications system 800 including a user system 805 communicating with a provider system 810 through a communications link 815. User system 805 typically includes one or more user devices 820 and one or more user controllers 825 for controlling the user devices 820. Provider system 810 typically includes one or more provider devices 835 and one or more provider controllers 840 for controlling the provider devices 835. The communications link 815 may include communication pathways 850 and 855 that enable communications through the one or more delivery networks 860.

Examples of each element within the communications system of FIG. 8 are broadly described above with respect to FIG. 7. In particular, the provider system 810 and communications link 815 typically have attributes comparable to those described with respect to the provider system 710 and the communications link 715 of FIG. 7. Likewise, the user system 805 of FIG. 8 typically has attributes comparable to and illustrates one possible implementation of the user system 705 of FIG. 7.

The user device 820 typically includes a general-purpose computer 870 having an internal or external storage 872 for storing data and programs such as an operating system 874 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 876 (e.g., word processing programs, database programs, spreadsheet programs, or graphics programs) capable of generating documents or other electronic content; client applications 878 (e.g., stand alone e-mail client or AOL client, CompuServe client, AIM client, AOL TV client, or ISP client, all of which may include a built-in or embedded e-mail or instant messaging client) capable of communicating with other computer users, accessing various computer resources, and viewing, creating, or otherwise manipulating electronic content; and browser applications 880 (e.g., Netscape's Navigator or Microsoft's Internet Explorer) capable of rendering standard Internet content and also capable of supporting a web-based e-mail client and a web-based instant messaging client.

The general-purpose computer 870 also includes a central processing unit 882 (CPU) for executing instructions in response to commands from the user controller 825. In one implementation, the user controller 825 includes one or more of the application programs installed on the internal or external storage 872 of the general-purpose computer 870. In another implementation, the user controller 825 includes application programs stored in and performed by one or more device(s) external to the general-purpose computer 870.

The general-purpose computer also includes a communication device 884 for sending and receiving data. One example of the communication device 884 is a modem. Other examples include a transceiver, a set-top box, a communication card, a satellite dish, an antenna, or another network adapter capable of transmitting and receiving data over the communications link 815 through a wired or wireless data pathway 850. The general-purpose computer 870 also may include a TV tuner 886 for receiving television programming in the form of broadcast, satellite, and/or cable TV signals. As a result, the user device 820 can selectively and/or simultaneously display network content received by communications device 884 and television programming content received by the TV tuner 886.

The general-purpose computer 870 typically includes an input/output interface 888 for wired or wireless connection to various peripheral devices 890. Examples of peripheral devices 890 include, but are not limited to, a mouse 891, a mobile phone 892, a personal digital assistant 893 (PDA), a MP3 player (not shown), a keyboard 894, a display monitor 895 with or without a touch screen input, a TV remote control 896 for receiving information from and rendering information to subscribers, and an audiovisual input device 898.

Although FIG. 8 illustrates devices such as a mobile telephone 892, a PDA 893, and a TV remote control 896 as being peripheral with respect to the general-purpose computer 870, in another implementation, such devices may themselves include the functionality of the general-purpose computer 870 and operate as the user device 820. For example, the mobile phone 892 or the PDA 893 may include computing and networking capabilities and function as a user device 820 by accessing the delivery network 860 and communicating with the provider system 810. Furthermore, the user system 805 may include one, some or all of the components and devices described above.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Techniques described may find particular utility when applied or adapted to systems and processes that maintain some or all status information or history locally as they enable sharing of local content among devices without complete reliance on centralized storage or functionality.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims. These general and specific aspects may be implemented using a system. a method, or a computer program, or any combination of systems, methods, and computer programs.

What is claimed is:

1. A method to transfer instant messaging sessions, comprising:
    receiving a selection of an instant messaging session from a plurality of instant messaging sessions to transfer from a first instant messaging controller on a first device to a second instant messaging controller on a second device, wherein the plurality of instant messaging sessions are perceivable on the first instant messaging controller;
    transferring at least a portion of the selected instant messaging session from the first instant messaging controller on the first device to the second instant messaging controller on the second device, wherein the transferred portion is perceivable on the second instant messaging controller;
    after the transferring and in response to the first instant messaging controller being in an idle state or an away state, interrupting the plurality of instant messaging sessions on the first instant messaging controller such that the plurality of instant messaging sessions are not perceivable on the first instant messaging controller;
    receiving a user input selection of at least one interrupted instant messaging session of the plurality of interrupted instant messaging sessions when the first instant messaging controller is in an active state; and
    in response to receiving the user input selection, making the at least one interrupted instant messaging session perceivable on the first instant messaging controller.

2. The method of claim 1, further comprising, in response to receiving the user input selection, refreshing the at least one interrupted instant messaging session on the first instant messaging controller such that an entire conversation of the at least one interrupted instant messaging session is perceivable on the first instant messaging controller.

3. The method of claim 1, further comprising, in response to receiving a second user input selection, refreshing the at least one interrupted instant messaging session on the first instant messaging controller such that an entire conversation of the at least one interrupted instant messaging session is perceivable on the first instant messaging controller.

4. The method of claim 1, further comprising causing an interface to be displayed, wherein the interface includes a user-selectable option to designate one or more of the interrupted instant messaging sessions to be made perceivable on the first instant messaging controller.

5. The method of claim 1, wherein interrupting the plurality of instant messaging sessions is performed in response to detecting a user-selected preference to perform the interrupting in the idle state or the away state.

6. The method of claim 1, further comprising:
    detecting that a user is signed on to the first instant messaging controller and the second instant messaging controller; and
    transmitting instructions to display menu options to enable the selection of the instant messaging session to transfer.

7. The method of claim 1, further comprising causing a device selection region to be displayed, the device selection region receptive to device selection input selecting a device to receive the at least a portion of the selected instant messaging session.

8. The method of claim 1, wherein a list of the plurality of instant messaging sessions is displayed in a user interface by the first device, and further comprising causing display of the user interface by the first device in response to a user signing on to the second instant messaging controller.

9. The method of claim 1, further comprising accessing an instant messaging online identity using the first instant messaging controller of the first device while the second instant messaging controller of the second device is concurrently accessing the instant messaging online identity, such that both the first device and the second device are able to receive instant messages sent to the instant messaging online identity.

10. A system to transfer instant messaging sessions, comprising:
    one or more processors; and
    a data store comprising instructions executable by the one or more processors, wherein the instructions, when executed by the one or more processors, cause the one or more processors to perform operations comprising:
    receiving a selection of an instant messaging session from a plurality of instant messaging sessions to transfer from a first instant messaging controller on a first device to a second instant messaging controller on a second device, wherein the plurality of instant messaging sessions are perceivable on the first instant messaging controller;
    transferring at least a portion of the selected instant messaging session from the first instant messaging controller on the first device to the second instant messaging controller on the second device, wherein the transferred portion is perceivable on the second instant messaging controller;
    after the transferring and in response to the first instant messaging controller being in an idle state or an away state, interrupting the plurality of instant messaging sessions on the first instant messaging controller such that the plurality of instant messaging sessions are not perceivable on the first instant messaging controller;
    receiving a user input selection of at least one interrupted instant messaging session of the plurality of interrupted instant messaging sessions when the first instant messaging controller is in an active state; and
    in response to receiving the user input selection, making the at least one interrupted instant messaging session perceivable on the first instant messaging controller.

11. The system of claim 10, wherein the operations further comprise, in response to receiving the user input selection, refreshing the at least one interrupted instant messaging session upon the first instant messaging controller such that an entire conversation of the at least one interrupted instant messaging session is perceivable on the first instant messaging controller.

12. The system of claim 10, wherein the operations further comprise, in response to receiving a second user input selection, refreshing the at least one interrupted instant messaging session on the first instant messaging controller such that an entire conversation of the at least one interrupted instant messaging session is perceivable on the first instant messaging controller.

13. The system of claim 10, wherein the operations further comprise causing an interface to be displayed, wherein the interface includes a user-selectable option to designate one or more of the interrupted instant messaging sessions to be made perceivable on the first instant messaging controller.

14. The system of claim 10, wherein the operation of interrupting the plurality of instant messaging sessions is performed in response to detecting a user-selected preference to perform the interrupting in the idle state or the away state.

15. The system of claim 10, wherein the operations further comprise:
   detecting that a user is signed on to the first instant messaging controller and the second instant messaging controller; and
   transmitting instructions to display menu options to enable the selection of the instant messaging session to transfer.

16. A non-transitory computer-readable medium storing instructions executable by one or more processors, the instructions when executed by the one or more processors causing the one or more processors to perform operations comprising:
   receiving a selection of an instant messaging session from a plurality of instant messaging sessions to transfer from a first instant messaging controller on a first device to a second instant messaging controller on a second device, wherein the plurality of instant messaging sessions are perceivable on the first instant messaging controller;
   transferring at least a portion of the selected instant messaging session from the first instant messaging controller on the first device to the second instant messaging controller on the second device, wherein the transferred portion is perceivable on the second instant messaging controller;
   after the transferring and in response to the first instant messaging controller being in an idle or an away state, interrupting the plurality of instant messaging sessions on the first instant messaging controller such that the plurality of instant messaging sessions are not perceivable on the first instant messaging controller;
   receiving a user input selection of at least one interrupted instant messaging session of the plurality of interrupted instant messaging sessions when the first instant messaging controller is in an active state; and
   in response to receiving the user input selection, making the at least one interrupted instant messaging session perceivable on the first instant messaging controller.

17. The non-transitory computer-readable medium of claim 16, wherein the operations further comprise, in response to receiving the user input selection, refreshing the at least one interrupted instant messaging session upon the first instant messaging controller such that an entire conversation of the at least one interrupted instant messaging session is perceivable on the first instant messaging controller.

18. The non-transitory computer-readable medium of claim 16, wherein the operations further comprise causing an interface to be displayed, wherein the interface includes a user-selectable option to designate one or more of the interrupted instant messaging sessions to be made perceivable on the first instant messaging controller.

19. The non-transitory computer-readable medium of claim 16, wherein the operation of interrupting the plurality of instant messaging sessions is performed in response to detecting a user-selected preference to perform the interrupting in the idle state or the away state.

20. The non-transitory computer-readable medium of claim 16, wherein the operations further comprise:
   detecting that a user is signed on to the first instant messaging controller and the second instant messaging controller; and
   transmitting instructions to display menu options to enable the selection of the instant messaging session to transfer.

* * * * *